United States Patent [19]
Wilkie, Jr. et al.

[11] Patent Number: 5,836,700
[45] Date of Patent: Nov. 17, 1998

[54] SPLIT BEARING SEAL

[75] Inventors: Robert C. Wilkie, Jr.; Robert M. Galewski, both of Virginia Beach; George E. Slemp, Lanexa, all of Va.

[73] Assignees: Cooper Split Roller Bearing Corporation, Virginia Beach; Advex Corporation, Hampton, both of Va.

[21] Appl. No.: 869,452

[22] Filed: Jun. 5, 1997

[51] Int. Cl.$^6$ .................................................. F16C 33/80
[52] U.S. Cl. ........................................ 384/480; 384/477
[58] Field of Search ................................... 384/480, 477, 384/144, 272, 273

[56] References Cited

U.S. PATENT DOCUMENTS

| | | | |
|---|---|---|---|
| 1,145,999 | 7/1915 | Kirner . | |
| 1,197,373 | 9/1916 | Hirth . | |
| 1,220,633 | 3/1917 | Hirth . | |
| 1,644,611 | 10/1927 | Rieffert . | |
| 1,747,867 | 2/1930 | Gregovsky . | |
| 2,397,753 | 4/1946 | Sale ............................................. | 286/6 |
| 2,668,743 | 2/1954 | Zeuzem . | |
| 2,850,311 | 9/1958 | Mansfield ................................... | 288/13 |
| 3,399,008 | 8/1968 | Farrell . | |
| 3,446,542 | 5/1969 | Whitehurst . | |
| 4,397,507 | 8/1983 | Kraus . | |
| 4,533,149 | 8/1985 | Vater ......................................... | 277/221 |
| 4,540,294 | 9/1985 | Lamperski ................................ | 384/273 |
| 4,550,479 | 11/1985 | Walter ....................................... | 29/148 |
| 4,580,793 | 4/1986 | Bronson .................................... | 277/199 |
| 4,639,150 | 1/1987 | Habermann ............................... | 284/536 |
| 4,688,953 | 8/1987 | Koch ......................................... | 384/615 |
| 4,708,498 | 11/1987 | Labedan .................................... | 384/560 |
| 4,875,784 | 10/1989 | Just ............................................ | 384/273 |
| 5,039,230 | 8/1991 | Phillips ..................................... | 384/560 |
| 5,505,546 | 4/1996 | Okude ....................................... | 384/428 |

*Primary Examiner*—Lenard A. Footland
*Attorney, Agent, or Firm*—Price, Heneveld, Cooper DeWitt and Litton

[57] ABSTRACT

A seal ring having first and second semicircular metal ring segments, each segment having first and second ends, the first end of the first segment having an interference interfit with the first end of the second segment, and the second end of the first segment having an interference fit with the second end of the second segment, to form the seal ring; the segments being separable or interconnectable by temporary deformation thereof, the first and second ends of the first segment having a radially convex surface and the first and second ends of the second segment having a radially concave surface of matching configuration to the convex surface, to form the interference interfit.

A method of forming a metal seal ring of separable semicircular segments of a predetermined diameter by providing an annular metal ring workpiece, wire EDM cutting transversely through the ring workpiece at a first circumferential location to form a first set of two adjacent ends, cutting a circumferentially extending shoulder on the radially inner portion of one of the adjacent ends and an opposite circumferentially extending shoulder on the radially outer portion of the other adjacent end, wire EDM cutting transversely through the ring workpiece at a second circumferential location diametrically opposite the first circumferential location, to separate the ring and thereby form a second set of two adjacent ends, forming by said cutting at the second location a circumferentially extending shoulder on the radially inner portion of one of the second set of adjacent ends and an opposite circumferentially extending shoulder on the radially outer portion of the other of the second set of adjacent ends, the cutting steps forming a pair of semicircular ring segments and including forming of interfitted, radially oriented, concave and convex surfaces on the first and second shoulders to create an interference fit and thereby allow the seal ring to be snap fitted together to form the seal ring separable into the two segments as necessary.

10 Claims, 3 Drawing Sheets

SPLIT BEARING SEAL

BACKGROUND OF THE INVENTION

This invention relates to a split seal ring, especially a split seal ring for use in combination with a bearing, and more specifically relates to an improved, annular, split, metal seal ring formed of two interlocking segments which are specially separable for replacement of the seal ring on a shaft.

Seal rings are widely used for sealing fluid containment such as oil and/or grease for a bearing assembly, or other applications. Because the seal surfaces are subject to wear, they are typically replaced periodically to avoid leakage or excessive leakage, or when required maintenance activities of a bearing assembly are necessary, for example. Conventional seal rings are formed of either one unitary piece or, if formed of two components, are pinned together at the junctures of dovetail fittings. Removal and/or replacement of a worn seal thus may require disassembly and later reassembly of adjacent machine components in a time consuming, costly operation. Some seals are necessarily of such thin dimensions that a pinned connection is not even feasible.

It is desirable to have a split seal ring which can be readily installed and removed as well as replaced by a new seal ring, without disturbing the shaft or removing machine elements such as drums, pulleys, fans, gears and the like mounted on the shaft along with the bearing, even if the seal is of thin dimensions.

SUMMARY OF THE INVENTION

It is a primary object of this invention to provide a split seal ring which can be installed, removed, or replaced, as in a bearing assembly, without disturbing the shaft or other machine elements. Another object is to provide a split seal that will allow a positive machine fit without extraordinary assembly measures or a pinned connection. This invention provides a sectioned seal ring with an improved facility for fastening the two halves of the ring together. Moreover, this can be done simply and easily for rapid inexpensive installation and/or replacement of seals, even for seals of thin dimensions. Further, the assembly is economical to manufacture.

The split seal ring has first and second metal ring segments interlocked with each other with an interference fit, one segment having a pair of circumferentially extending, radially inner shoulders, and the other having opposite circumferentially extending radially outer shoulders which "snap" together with the inner shoulders into a dimensionally accurate seal ring. Radially outer faces of the inner shoulders have an interference fit with radially inner faces of the outer shoulders, preferably with interfitted concave and convex surfaces which are generally V-shaped. These interference faces have radially offset portions of about 0.020 to about 0.030 inch such that by minor temporary deformation of the semicircular segments, the seal segments can be easily and quickly fitted together or taken apart.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
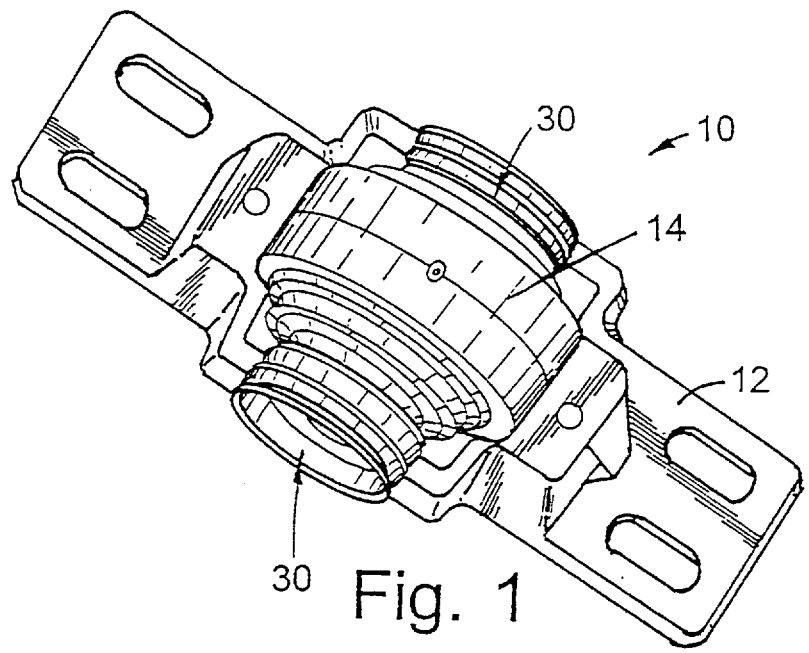
FIG. 1 is a perspective view of a bearing assembly showing a pair of split ring seals at opposite sides thereof in accordance with this invention.
Figure 2:
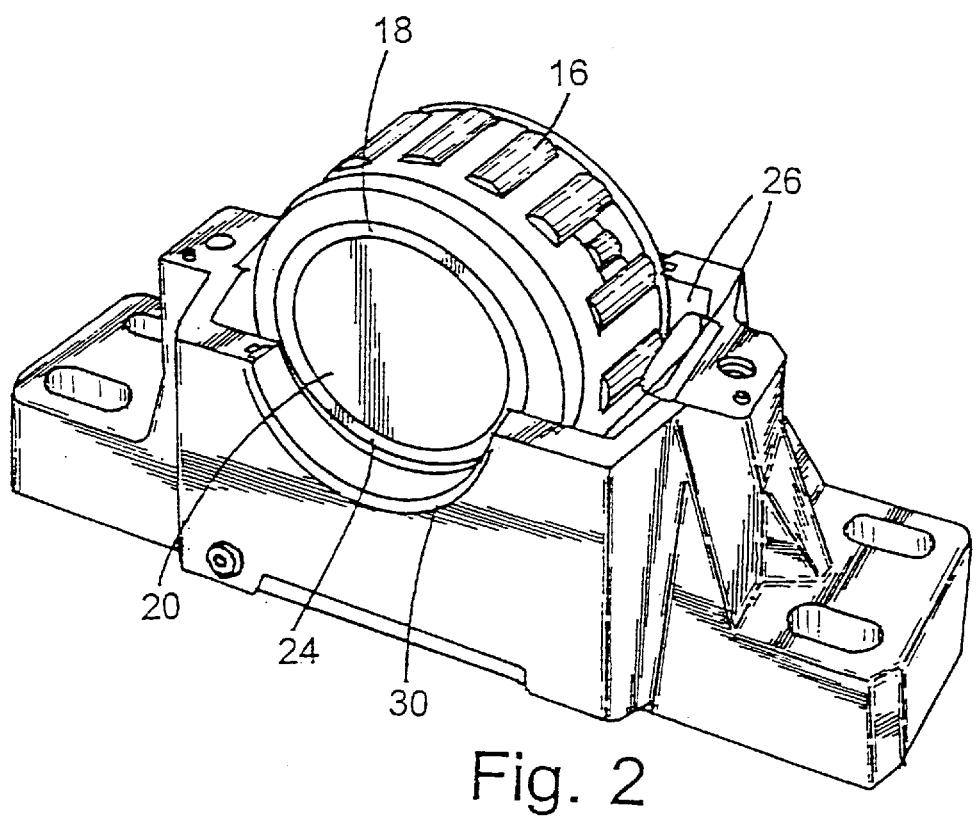
FIG. 2 is a perspective view of the bearing assembly in FIG. 1 with the upper bearing cap removed from a roller bearing element, and the upper portions of the two split seals removed.
Figure 3:
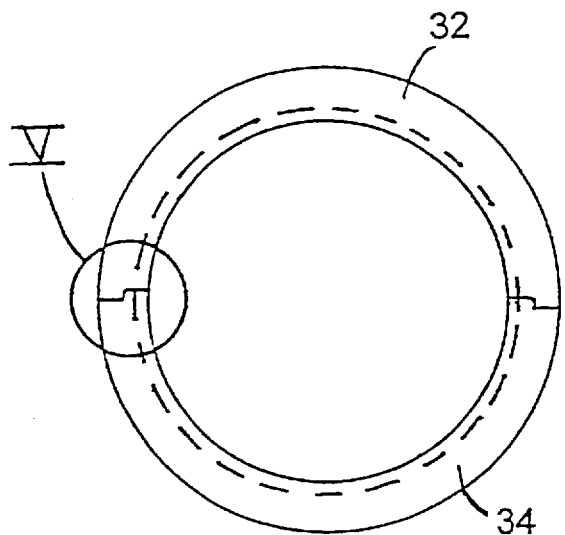
FIG. 3 is an end elevational view of the novel split seal ring.
Figure 4:
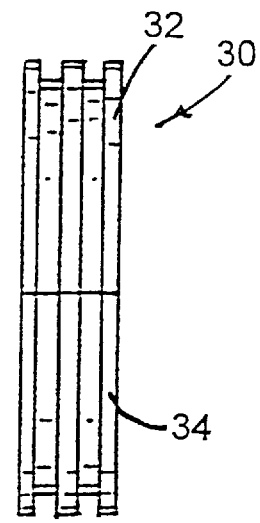
FIG. 4 is an elevational view of the ring in FIG. 3 from the right-hand side.

Referring now specifically to the drawings, a bearing assembly 10 is there depicted including the bearing mount 12, an upper shroud 14, the upper half roller and cage assembly 16, upper half race 18, lower half race 20, lower half roller and cage assembly, lower shroud 24, two annular seal labyrinths 26 in the bearing support housing, and two of the novel seal rings 30 on opposite sides of the bearing assembly and seal labyrinths. A shaft (not shown) can extend axially through both seal rings, labyrinths, and the bearing.

Figure 5:
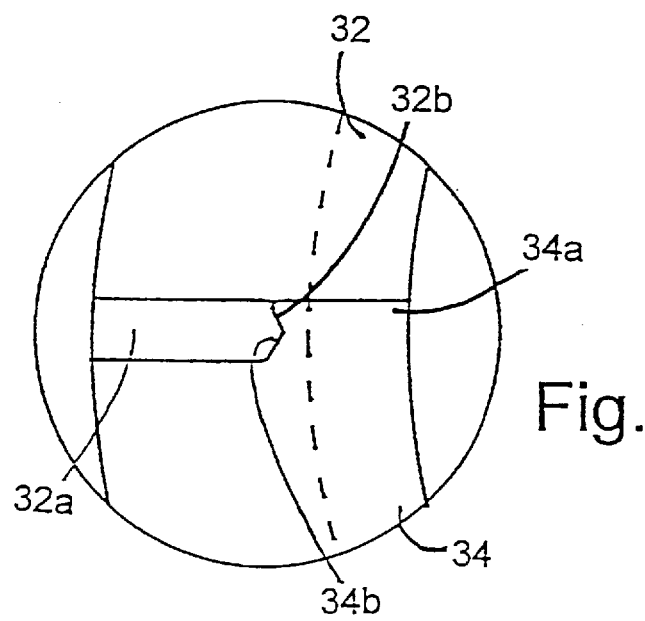
FIG. 5 is a fragmentary, enlarged, elevational view of one of the junctures of the two segments forming the split seal ring in FIG. 3, the opposite juncture being a mirror image version of the one shown.

Each seal ring 30 is formed of two machined semicircular segments 32 and 34, here shown arranged as upper and lower segments. This embodiment of the ring is shown to have three radially inwardly extending circumferential seal flanges and two intermediate grooves. Segment 32 has a circumferentially extending end shoulder 32a (FIG. 5) on each end of the segment. This shoulder is located on the radially outer portion of the segment. The radially inner face of shoulder 32a has a convex surface 32b of generally V-shaped configuration. This convex surface has a radial offset typically of about 0.020 to 0.030 inch, the specific size depending on the diameter of the seal ring. Thus, for a seal ring with an OD of 3.3 to 3.5 inches, typically an offset of 0.020 inch would be used, while a seal ring of 4.1 to 4.6 inches would use an offset of about 0.025 inch, and seal rings of OD 5.2 to 5.6 or so would use an offset of 0.030 inch. Ring segment 34 has on both of its ends circumferentially extending shoulders 34a which extend in the opposite direction as shoulders 32a. Shoulders 34a are on the radially inner portion of segment 34. The radially outer face 34b of shoulder 34a is shown to have a concave surface of a configuration matching that of the convex surface 32b, preferably of generally V-shaped configuration, and interfitting therewith. Thus, segment 32 has on its opposite ends outer shoulders 32a of mirror image to each other, and segment 34 has on its opposite ends shoulders 34a of mirror image to each other. The radial offset of each concave surface 34b is equal to that of convex surface 32b.

The interfit of segments 32 and 34 comprises an interference fit when the two ring segments are transversely pressed toward each other to interconnect them. This is accomplished by temporarily deforming the segments, with shoulders 34a moving radially inwardly and shoulders 32a moving radially outwardly, and then back to the original position in a "snap" fit type action. The ring can thus be readily installed on a shaft. Furthermore, removal of the ring from the bearing and shaft, as for replacement, can be readily accomplished by pulling or prying the two segments apart transverse to the axis of the ring, again causing temporary resilient deformation of the segments.

Figure 6A:
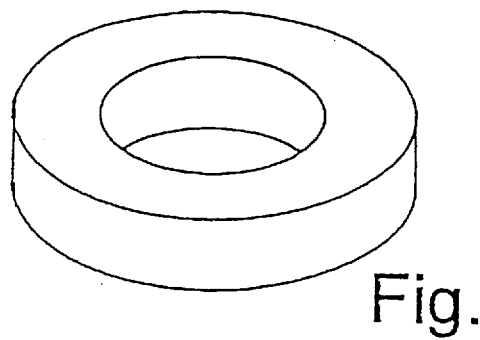
FIGS. 6A–6D are diagrammatic perspective views of sequential process steps for forming the novel split seal, with FIG. 6A depicting the raw workpiece, FIG. 6B depicting the first cut through the workpiece by EDM wire cutting, FIG. 6C depicting the second cut through the workpiece by EDM wire cutting, and FIG. 6D showing the interfitted workpiece ready for final machining.
Figure 6B:
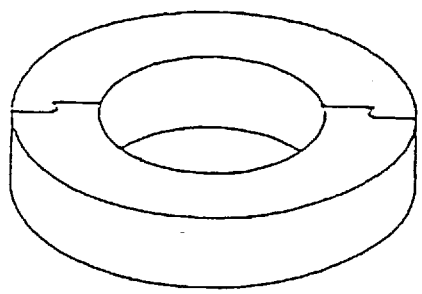
Figure 6C:
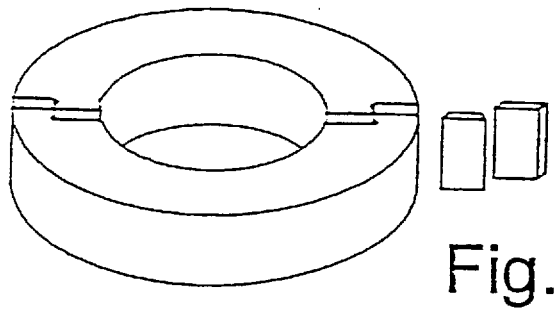
Figure 6D:
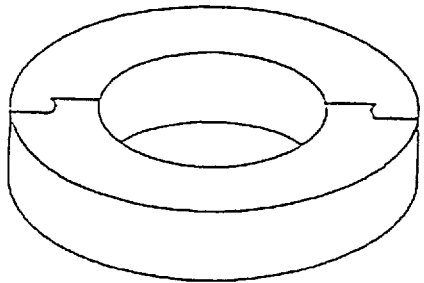

In FIGS. 6A–6D are depicted sequential process steps for forming the novel split seal from raw stock. The special ring segment is achieved by first forming a unitary new stock ring of one piece having a smaller ID and larger OD than the predetermined size of the final interlocked segmented ring. This can be done by cutting annular slices off an aluminum tube, for example (FIG. 6A). This over sized, one-piece ring is then cut through transversely by wire Electric Discharge Machining (EDM) (FIG. 6B) using a conventional EDM tool. Several rings can be grouped and cut simultaneously, if desired. The wire is caused to travel in the special configuration pattern relative to the ring to form two adjacent shoulders on one side of the two segments. Then the diametrically opposite side of the ring, i.e., opposite the first cut, is wire EDM cut in mirror image pattern to that of the first cut. After these two cuts are made, the EDM tool is reset to make a second cut about 0.025 inch circumferentially from the first cut. The ring is cut through again on both diametral sides of the ring (FIG. 6C), in mirror image cuts, removing cut thin material slugs to create the desired interference fit. The segments are brought together, removing the gaps where the slugs were, to form the seal blank (FIG. 6D). When the two segments are moved together slightly to remove the thin slots on both ends, the newly formed segmented interlocked ring results. This seal blank can then be further machined as a ring to the exact OD, ID and axial final dimensions desired. The seal ring is retained in this connected condition until separated just prior to installation on a shaft, i.e., in a bearing.

The above description is considered that of the preferred embodiment only. Modifications of the invention will occur to those skilled in the art and to those who make or use the invention. For example, the convex faces can be on the radially inner shoulders rather than the radially outer shoulders as depicted, and the cooperative concave faces can be on the radially outer shoulders rather than the radially inner shoulders as depicted. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The embodiments of the invention in which an exclusive property or privilege is claimed are defined as follows:

1. A bearing and seal ring assembly comprising:

a bearing subassembly;

a pair of seal rings astraddle said bearing subassembly;

each of said seal rings comprising first and second semi-circular metal ring segments, each said segment having first and second ends;

said first end of said first segment having an interference interfit with said first end of said second segment, and said second end of said first segment having an interference fit with said second end of said second segment, to form said seal ring;

said segments being separable or interconnectable by temporary deformation of said segments;

said first and second ends of said first segment having radially convex surfaces and said first and second ends of said second segment having radially concave surfaces of matching configuration to said convex surfaces, to form said interference interfit.

2. The bearing and seal assembly in claim 1, wherein said first and second ends of said first segment have circumferentially extending shoulders on the radially inner portion of said first segment, and said first and second ends of said second segment have circumferentially extending shoulders on the radially outer portion of said second segment.

3. The bearing and seal assembly in claim 2 wherein said shoulders on said first segment have radially outwardly oriented faces, and said shoulders on said second segment have radially inwardly oriented faces.

4. The bearing and seal assembly in claim 3 wherein said convex and concave surfaces are on said radially outwardly oriented faces and said radially inwardly oriented faces, respectively.

5. The bearing and seal assembly in claim 2 wherein said concave surfaces are on said first segment shoulders and said convex surfaces are on said second segment shoulders.

6. A bearing and seal ring assembly comprising:

a bearing subassembly;

a pair of seal rings astraddle said bearing subassembly;

each of said seal rings comprising first and second semi-circular metal ring segments, each said segment having first and second ends;

said first and second ends of said first segment having circumferentially extending shoulders on the radially inner portion of said first segment, and said first and second ends of said second segment having circumferentially extending shoulders on the radially outer portion of said second segment;

said shoulders on said first segment having a radially outwardly oriented face, and said shoulders on said second segment having a radially inwardly oriented face;

convex and concave surfaces being on said radially outwardly oriented and said radially inwardly oriented faces, respectively;

said segments being separable or interconnectable by temporary deformation of said segments; and said first and second ends of said first segment having said radially convex surfaces and said first and second ends of said second segment having said radially concave surfaces of matching configuration to said convex surface, to form said interference interfit.

7. The bearing and seal assembly in claim 6, wherein said first and second ends of said first segment have circumferentially extending shoulders on the radially inner portion of said first segment, and said first and second ends of said second segment have circumferentially extending shoulders on the radially outer portion of said second segment.

8. The bearing and seal assembly in claim 7 wherein said shoulders on said first segment have radially outwardly oriented face, and said shoulders on said second segment have radially inwardly oriented faces.

9. The bearing and seal assembly claim 8 wherein said convex and concave surfaces are on said radially outwardly oriented faces and said radially inwardly oriented faces, respectively.

10. The seal ring in claim 7 wherein said concave surfaces are on said first segment shoulders and said convex surfaces are on said second segment shoulders.

* * * * *

UNITED STATES PATENT AND TRADEMARK OFFICE
CERTIFICATE OF CORRECTION

PATENT NO. : 5,836,700
DATED : November 17, 1998
INVENTOR : Wilkie, Jr. et al.

It is certified that error appears in the above-identified patent and that said Letters Patent is hereby corrected as shown below:

Column 4, claim 9, line 59;

After "assembly" insert --in--.

Column 4, claim 10, line 63;

Delete "seal ring" and insert --bearing and seal assembly--.

Signed and Sealed this

Eighteenth Day of May, 1999

*Attest:*

Q. TODD DICKINSON

*Attesting Officer*     *Acting Commissioner of Patents and Trademarks*